(12) United States Patent
Anderson et al.

(10) Patent No.: US 6,262,769 B1
(45) Date of Patent: *Jul. 17, 2001

(54) METHOD AND SYSTEM FOR AUTO ROTATING A GRAPHICAL USER INTERFACE FOR MANAGING PORTRAIT AND LANDSCAPE IMAGES IN AN IMAGE CAPTURE UNIT

(75) Inventors: Eric C. Anderson, San Jose; George W. Dalke, Palo Alto, both of CA (US)

(73) Assignee: FlashPoint Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,898

(22) Filed: Jul. 31, 1997

(51) Int. Cl.⁷ ................................. H04N 5/222
(52) U.S. Cl. ............ 348/333.1; 348/231; 348/232; 348/233; 348/334; 348/374; 348/321; 348/362; 396/50; 396/311
(58) Field of Search ................. 348/231, 232, 348/333, 334, 374, 321, 362, 369; 396/50, 311

(56) References Cited

U.S. PATENT DOCUMENTS

| 5,270,831 | * | 12/1993 | Parulski et al. | 348/321 |
| 5,448,372 | | 9/1995 | Axman et al. | 358/342 |
| 5,576,759 | * | 11/1996 | Kawamura et al. | 348/321 |
| 5,619,738 | * | 4/1997 | Petruchik | 396/311 |
| 5,640,627 | * | 6/1997 | Nakano et al. | 396/296 |
| 5,764,291 | * | 6/1998 | Fullam | 348/362 |
| 5,821,997 | * | 10/1998 | Kawamura et al. | 348/231 |
| 5,900,909 | * | 5/1999 | Parulski et al. | 348/232 |
| 5,937,106 | * | 8/1999 | Murayama | 382/296 |
| 5,949,408 | * | 9/1999 | Kang et al. | 345/169 |
| 5,973,734 | * | 10/1999 | Anderson | 348/239 |
| 6,011,585 | * | 1/2000 | Anderson | 348/272 |
| 6,011,926 | * | 1/2000 | Cockell | 396/50 |

* cited by examiner

*Primary Examiner*—Wendy R. Garber
*Assistant Examiner*—Jacqueline Wilson
(74) *Attorney, Agent, or Firm*—Sawyer Law Group LLP

(57) ABSTRACT

The present invention provides a method and apparatus for automatically rotating a graphical user interface for managing portrait and landscape captures in an image capture unit. A method and apparatus for viewing an image in an image capture unit including a display comprises the steps of providing a first orientation associated with the image and providing a second orientation associated with the image capture unit. It is then determined whether the first orientation is different from the second orientation, and the image is displayed in the second orientation if the first and second orientations are different from each other.

42 Claims, 14 Drawing Sheets

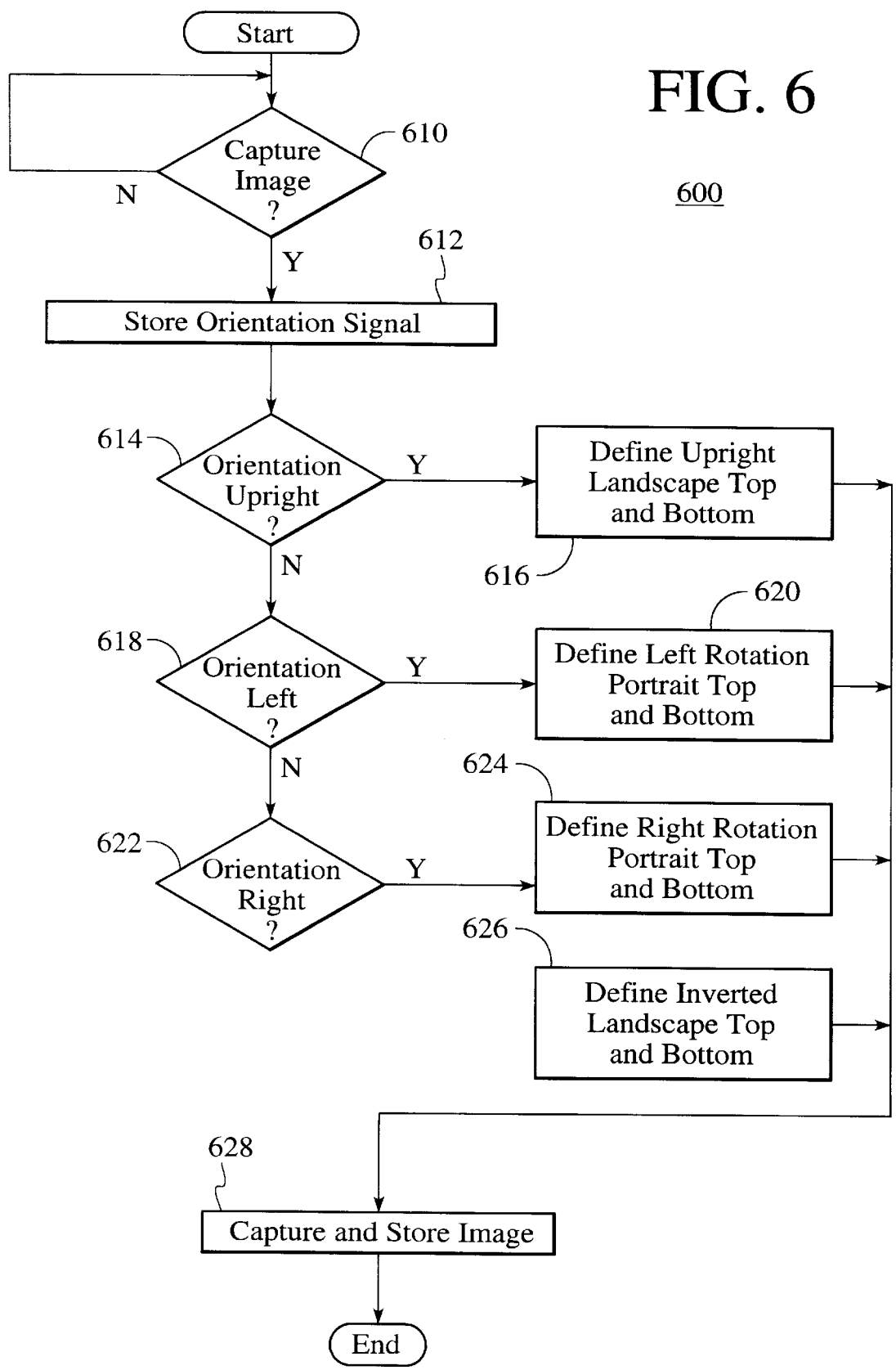

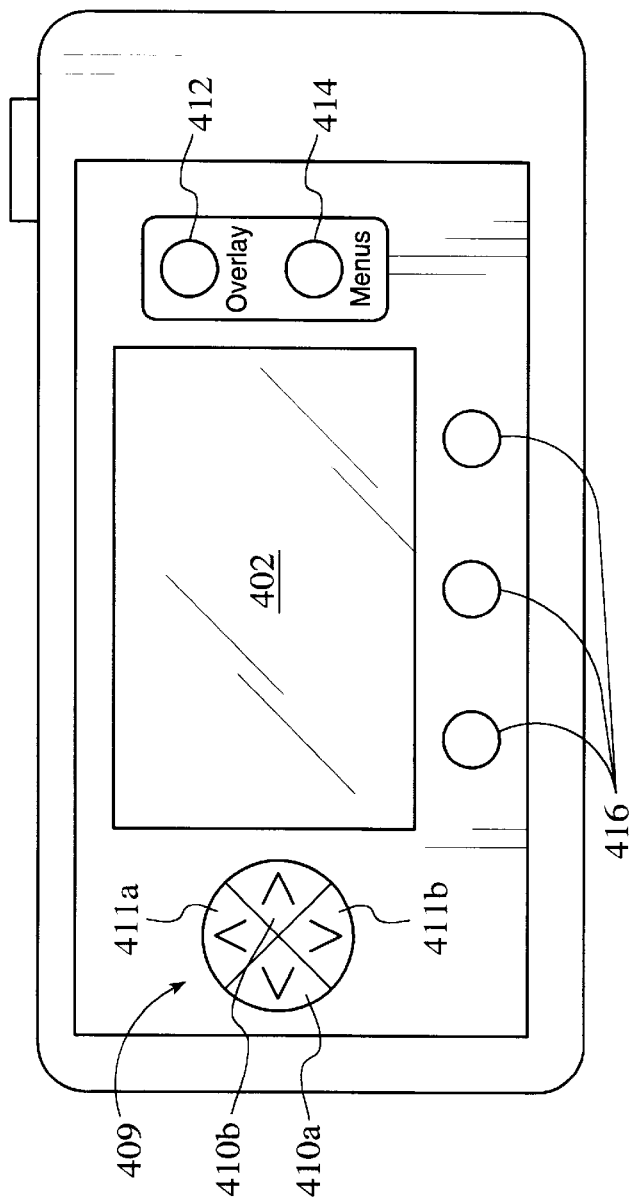
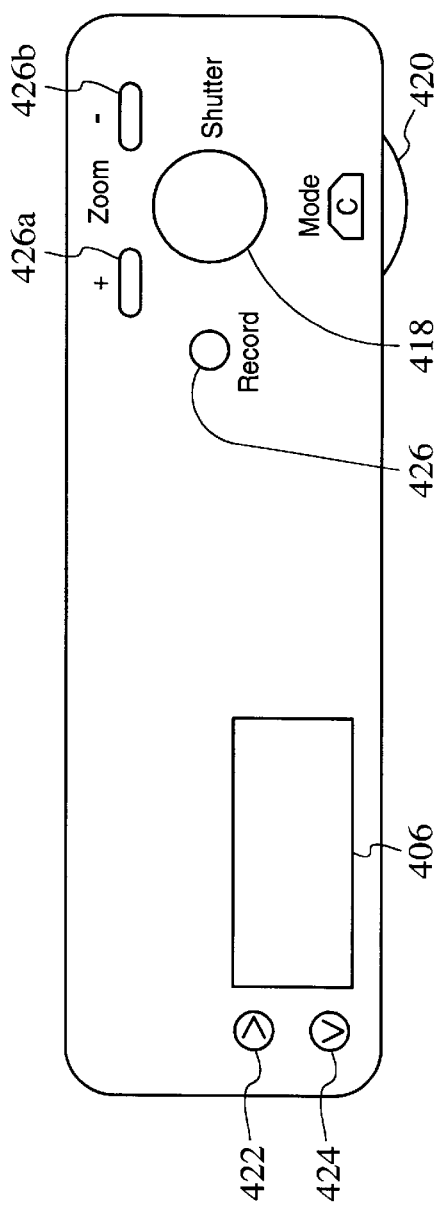
FIG. 7A
FIG. 7B

METHOD AND SYSTEM FOR AUTO ROTATING A GRAPHICAL USER INTERFACE FOR MANAGING PORTRAIT AND LANDSCAPE IMAGES IN AN IMAGE CAPTURE UNIT

CROSS-REFERENCE TO RELATED APPLICATION

This application is related to U.S. Ser. No. 08/916186 (JAS 740P/P127), entitled "Method and System of Organizing DMA Transfers to Support Image Rotation." This application is also related to U.S. Ser. No. 08/795,587, filed Feb. 6, 1997, which is a continuation of Ser. No. 08/384,012, entitled "Apparatus and Method for Camera Image and Orientation Capture". Both applications are assigned to the same assignee as the instant application.

FIELD OF THE INVENTION

The present invention relates generally to digital cameras, and more particularly to a method and apparatus for rotating a graphical user interface for managing portrait and landscape captures in a digital camera.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode. In record mode, the LCD is used as a viewfinder in which the user may view an object or scene before taking a picture. In play mode, the LCD is used as a playback screen for allowing the user to review previously captured images either individually or in arrays of four, nine, or sixteen images.

Digital camera user interfaces typically include a number of buttons or switches for setting the camera into one of the two modes and for navigating between images in play mode. One type of camera, for instance, includes two navigation buttons labeled "−" and "+", a mode button, a display button, a zoom button and a delete button. Play mode for this camera begins with a default screen displaying a full-sized individual image. Other images stored in the camera may then be displayed in a backward or forward sequence by pressing the "−" and "+" navigation buttons, respectively. Pressing the mode button during play mode causes four images to be displayed in a 2×2 array, and pressing the mode button again causes nine images to be displayed in a 3×3 array. The user can then "page" through screens of image arrays by pressing the navigation buttons, or the user can move from image to image in the arrays by first pressing the display button and then traversing across the images in the rows of the arrays using the navigation buttons. The user may have the full-sized image displayed of a chosen image by pressing the zoom button or can delete the image by pressing the delete button.

Digital cameras typically have a play mode in which a user can view a full-size image of a scene which has been previously captured. The user may choose to continuously view several images. It can be a nuisance, however, when some of the images are in landscape format, while other images are in portrait format. If the user is viewing several images one after another, the user must rotate the digital camera every time a landscape image appears after a portrait image, and vice versa.

What is needed is a method and apparatus for automatically rotating the images to a consistent format to avoid the user having to frequently rotate the camera. The present invention addresses such a need.

SUMMARY OF THE INVENTION

The present invention provides a method and apparatus for automatically rotating a graphical user interface for displaying the image in the same orientation as the image capture unit. A method and apparatus for viewing an image in an image capture unit including a display comprises the steps of providing a first orientation associated with the image and providing a second orientation associated with the image capture unit. It is then determined whether the first orientation is different from the second orientation, and the image is displayed in the second orientation if the first and second orientations are different from each other.

BRIEF DESCRIPTION OF THE DRAWINGS

FIG. 6 is a flow chart of a method for camera image and orientation capture.

FIGS. 7a and 7b are diagrams depicting the back and top view, respectively, of a digital camera.

DETAILED DESCRIPTION OF THE INVENTION

The present invention relates to a method and apparatus for viewing an image in a digital camera. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention is a method and apparatus for automatically rotating a graphical user interface for managing portrait and landscape captures in a digital camera. According to the present invention, an apparatus and method is provided for providing a digital camera with the ability to present both landscape and portrait images which can be presented in an orientation consistent with the orientation of the camera. In operation, the user is no longer required to change the orientation of the camera by rotating the camera whenever a portrait image follows a landscape image, or vice versa, when the user is viewing a series of images in, for example, play mode or instant review mode.

Although the present invention is described in terms of a digital camera, the digital camera is merely an example of an image capture unit. It is to be understood that the present invention applies to any image capture unit, such as a digital scanner.

Figure 1:
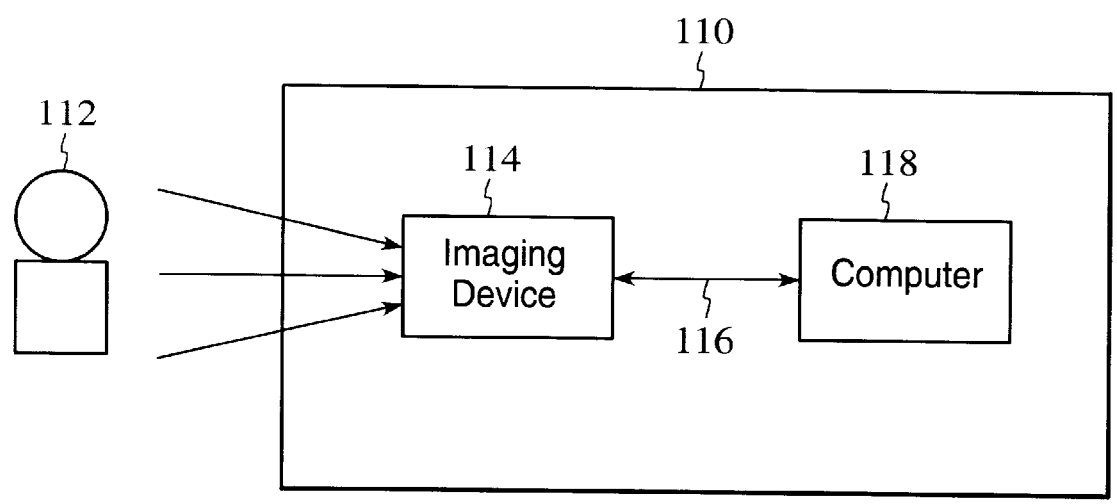
FIG. 1 is a block diagram of a digital camera in which the present invention can reside.

Referring now to FIG. 1, a block diagram of a digital camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
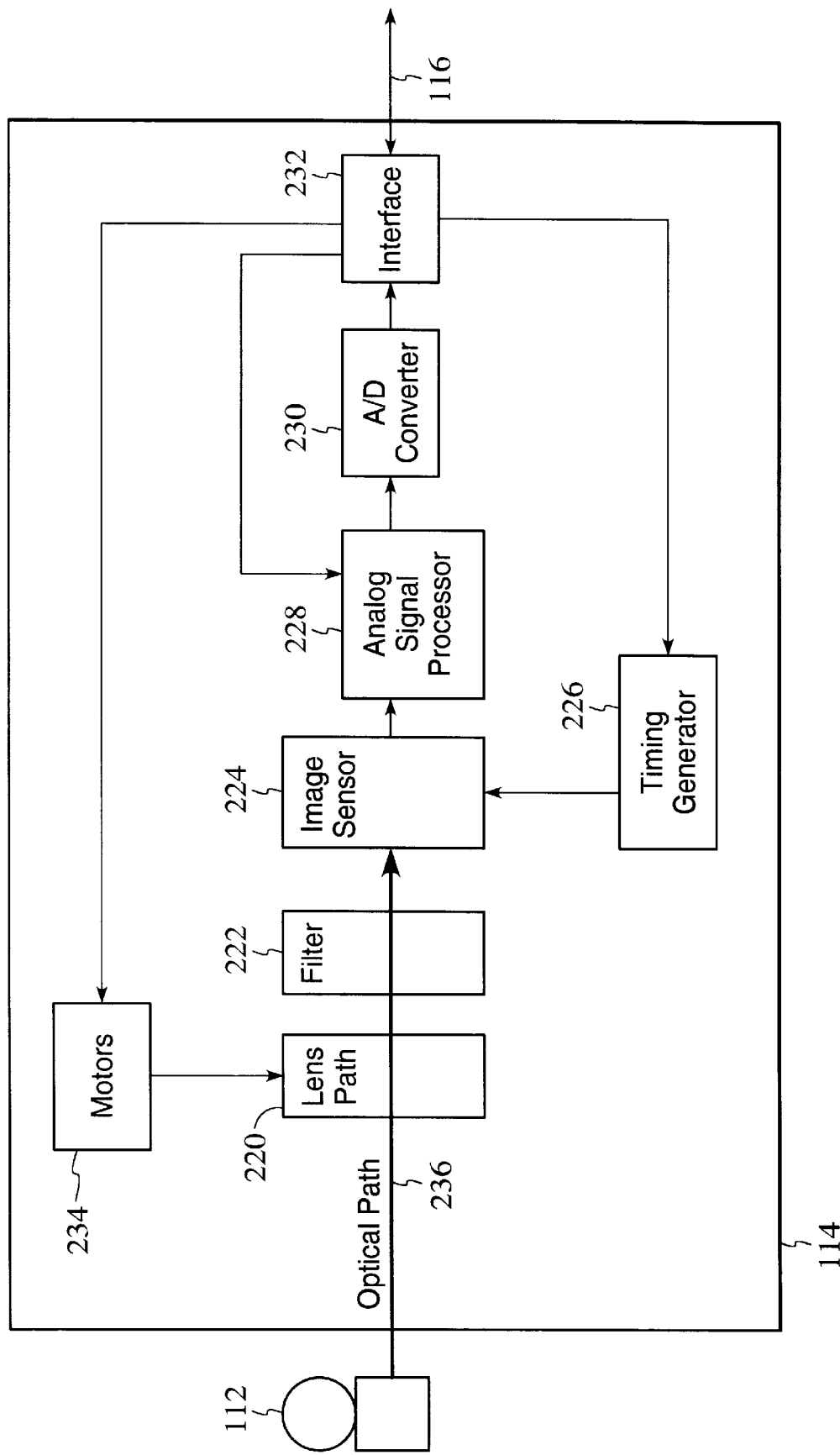
FIG. 2 is a block diagram of an example of an imaging device of FIG. 1.

Referring now to FIG. 2, a block diagram of an example of an imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is preferably a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
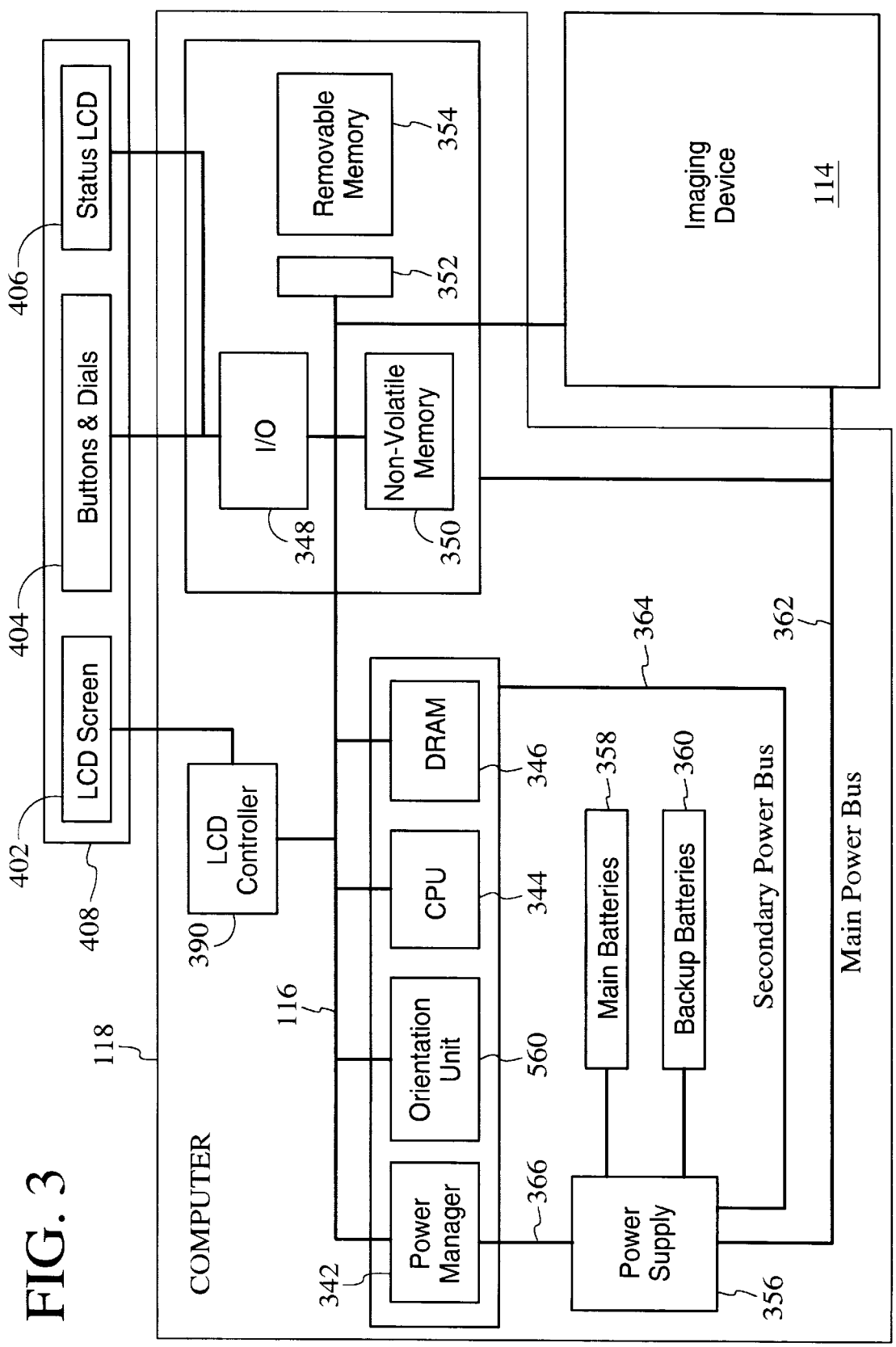
FIG. 3 is a block diagram of an example of the computer of FIG. 1.

Referring now to FIG. 3, a block diagram of an example of computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. An orientation unit 560 is included to detect the orientation of the camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 402 for display.

Co-pending patent application Ser. No. 08/795,587 filed Feb. 6, 1997, which is a continuation of Ser. No. 08/384,012 and assigned to the same assignee, entitled "Apparatus and Method for Camera Image and Orientation Capture" is incorporated herein by reference and provides a detailed discussion of the orientation unit 560. The orientation unit 560 can sense which position the digital camera is currently in. The orientation unit 560 sends signals to the CPU 344 indicating the current orientation of the digital camera.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. Removable memory 354 can be implemented by using a flash disk.

Power supply 356 supplies operating power to the various components of camera 110. The power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
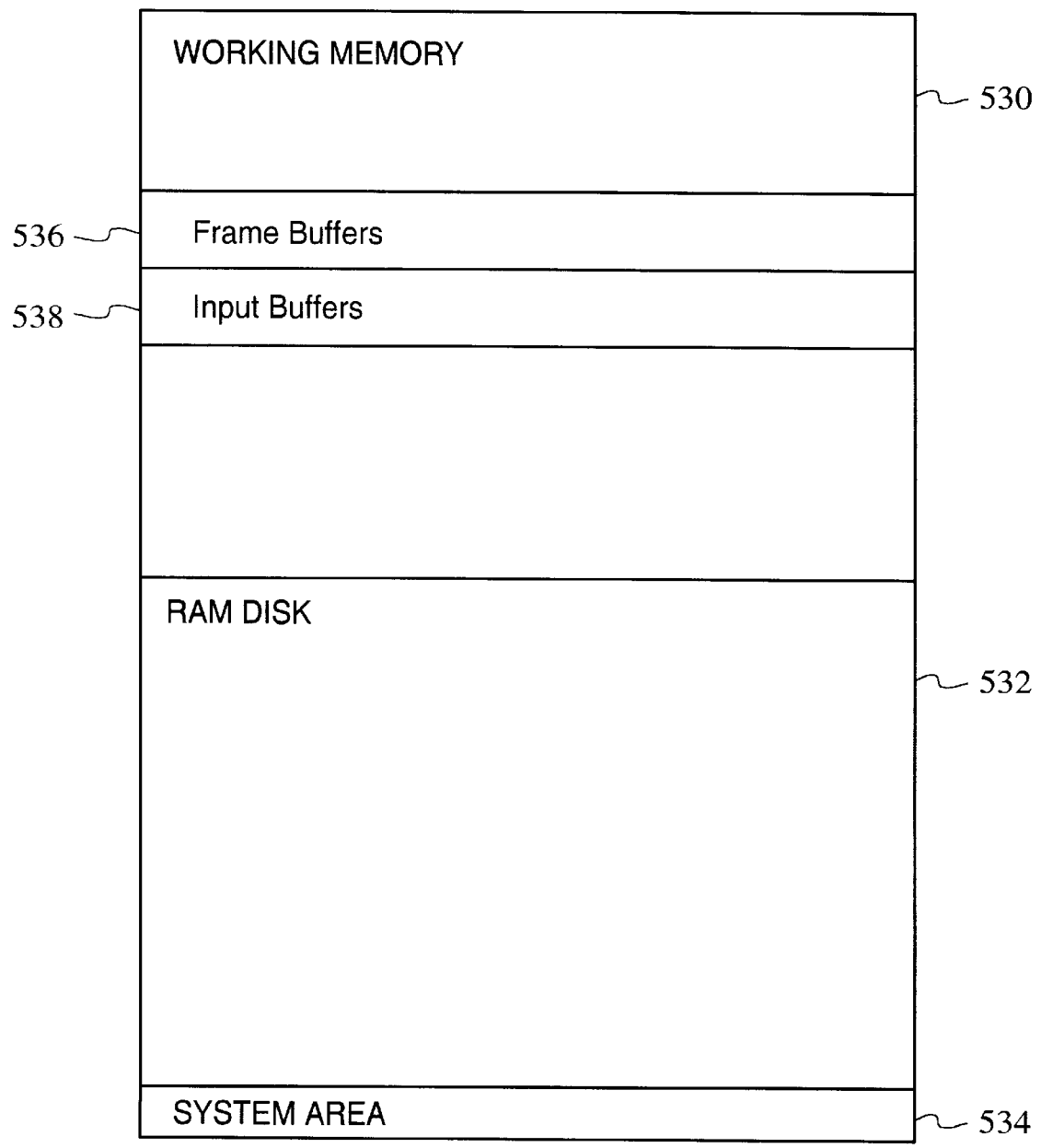
FIGS. 4a and 4b are memory maps showing the dynamic access memory.

Referring now to FIG. 4A, a memory map showing the dynamic random-access-memory (DRAM) 346 is shown. DRAM 346 is shown to include RAM disk 532, a system area 534, and working memory 530.

RAM disk 532 is a memory area used for storing raw and compressed image data and typically is organized in a "sectored" format similar to that of conventional hard disk drives. RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 402.

The conversion process is performed by a live view generation program, which is stored in non-volatile memory 350 and executed on CPU 344. However, the conversion process can also be implemented using hardware. Referring again to FIG. 3, during the execution of the live view generation program (not shown), the CPU 344 takes the raw image data from the input buffers 538 in CCD format and performs color space conversion on the data. The conversions process performs gamma correction and converts the raw CCD data into either a RGB or YCC color format which is compatible with the LCD screen 402. After the conversion, CPU 344 stores the image data in the frame buffers 536. The LCD controller 390 then transfers the processed image data from the frame buffers to the LCD screen 402 (via an optional analog converter) for display.

Figure 4B:
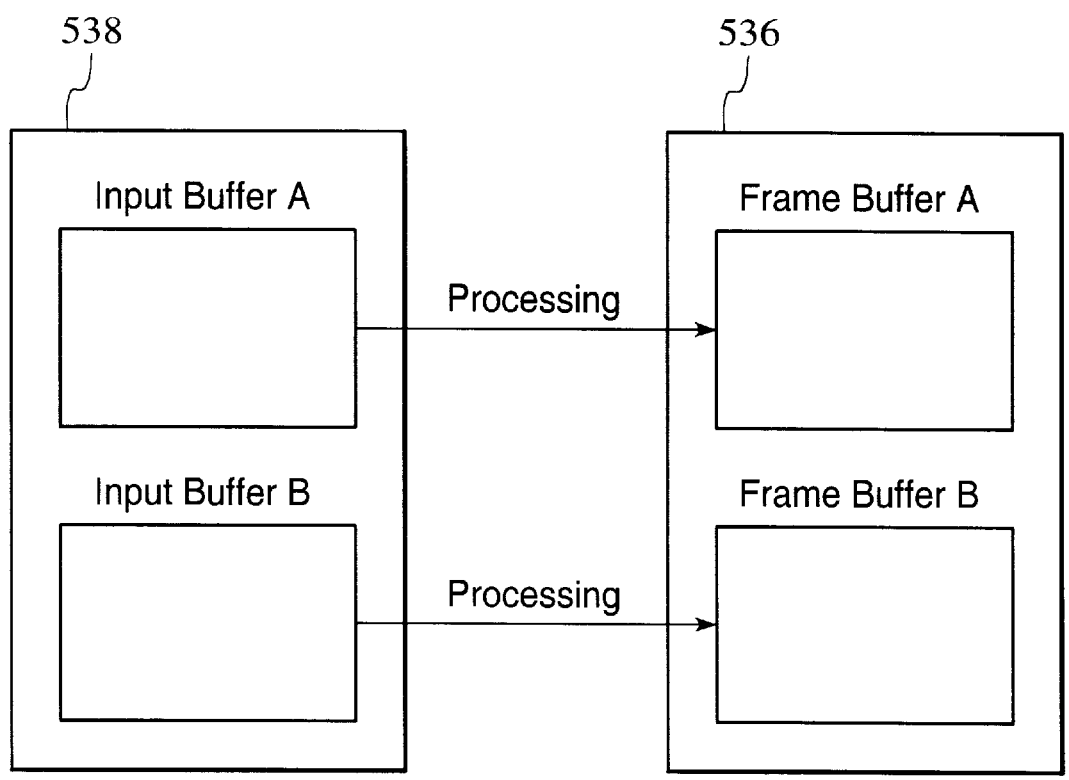

Referring now to FIG. 4B, the contents of input buffers 538 and the frame buffers 536 are shown. Both the input buffers 538 and the frame buffers 536 can utilize two separate buffers, called ping-pong buffers, to improve the display speed of the digital camera and to prevent the tearing of the image in the display 402. As shown, input buffers 538 include an input buffer A and an input buffer B, and frame buffers 536 include a frame buffer A and a frame buffer B.

The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536. More specifically, while input buffer A is filling with image data, the data from input buffer B is processed and transmitted to frame buffer B. At the same time, previously processed data in frame buffer A is output to the LCD screen 402 for display. While input buffer B is filling with image data, the data from input buffer A is processed and transmitted to frame buffer A. At the same time, previously processed data in frame buffer B is output to the LCD screen 402 for display.

Figure 5:
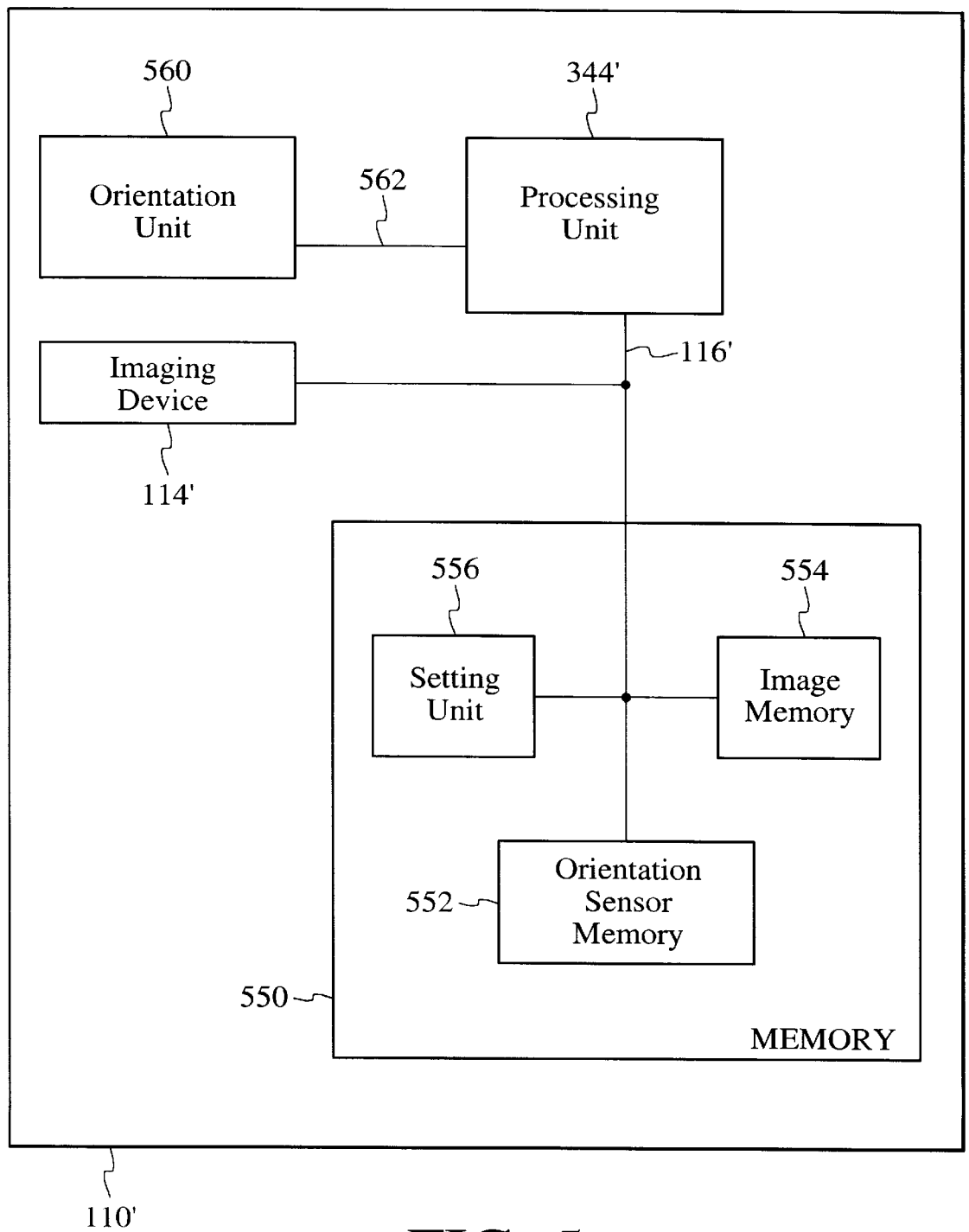
FIG. 5 is a block diagram of a portion of one embodiment of a digital camera including an orientation unit.

FIG. 5 depicts a portion of one embodiment of the camera 110' including an orientation unit 560. Components similar to those discussed with respect to FIGS. 1 through 3 are labeled similarly. The digital camera 110' includes a processing unit 344' having at least one orientation input, at least one setting input and a bidirectional communications port; and an imaging device 114'. The orientation unit 560 has at least one orientation output. A memory 550 includes an image memory 554, a setting unit 60, and an orientation memory 552. The memory 550 can be included in one or more of the components of the camera 110, including the DRAM 346 or the non-volatile memory 350.

Each orientation output of the orientation unit 560 is coupled to a corresponding orientation input of the processing unit 344' via an orientation signal line 562. The bidirectional communication port of the processing unit 344', the memory 550, and the output of the imaging device 114' are coupled via common bus 116'. In an alternative embodiment, the orientation unit 560 may also be coupled to the processing unit 344' through the common bus 116'. The processing unit 344', the imaging device 114', the orientation unit 560, and the memory 550 are also coupled to a power source, not shown.

In one embodiment, the orientation unit 560 includes first and second orientation sensors (not shown). In this embodiment, the first orientation sensor determines whether the camera 110' is rotated to the left or right orientation. Thus, the first orientation sensor determines whether the camera has been rotated to a left rotation portrait, a right rotation portrait, an upright or an inverted position. In this embodiment, the first orientation sensor outputs a left orientation signal for left rotation portraits and a right orientation signal for right rotation portraits. The second orientation sensor determines whether the camera 110' is tilted forward or backward. In such an embodiment, the second orientation sensor outputs a forward and a backward orientation signal.

Referring now to FIG. 6, a flow chart of one method 600 for camera image and orientation capture is shown. The method 600 is used for capture of four orientations: upright landscape, inverted landscape, left orientation (for a left rotation portrait image), and right orientation (for a right rotation portrait image). When only one orientation unit 560 of FIG. 3 is used, if the camera is tilted forward or backward, then a predetermined orientation, such as upright landscape, can be selected. The predetermined orientation is preferred to be used when the camera is tilted forward or backward because the orientation unit 560 of FIG. 3 may not operate properly if the camera is tilted.

First, the processing unit 344' determines whether the image is to be captured via step 610. In one embodiment, this determination is made based on ascertaining whether an image capture button, not shown, has been depressed. The processing unit 344' may determine whether the image capture button has been depressed by monitoring the value of a shutter activation signal, not shown. If an image is not to be captured, then subsequent steps are not executed. If an image is to be captured, the processing unit 344' stores the right and left orientation signals in the orientation signal memory 552 via step 612. In one embodiment, the stored orientation signals include the left and right orientation signals as well as the forward and backward orientation signals. Next, the setting unit 556 receives the orientation signals determines whether the camera 110' is in an upright orientation in step 614. It the camera 110' is in an upright orientation, the setting unit 556 defines the top portion and the bottom of the image as the top and bottom, respectively, of an upright landscape image via step 616.

If the setting unit 556 determines in step 614 that the camera 110' is not in an upright orientation, then the setting unit 556 determines whether the camera 110' is in a left orientation in step 618. If the camera 110' is in a left orientation, the setting unit 556 defines the top and bottom of the image as the top and bottom, respectively, of a left rotation portrait image via step 620.

If the setting unit 556 determines in step 618 that the camera 110' is not in a left orientation, then the setting unit 556 determines whether the camera 110' is in a right orientation in step 622. If the camera 110' is in a right orientation, the setting unit 556 defines the top and bottom of the image as the top and bottom, respectively, of a right rotation portrait image via step 624.

If the setting unit 556 determines in step 622 that the camera 110' is not in a right orientation, the setting unit 556 defines the top and bottom of the image as the top and bottom, respectively, of an inverted landscape image. After each of the steps 616, 620, 624, or 626, the processing unit 344' issues an image capture command via step 628, transferring the pixel signals output by the imaging device 114' to the image memory 554'.

Referring again to FIG. 5, portions of the memory 550, such as image memory 554, may be included in the DRAM 346. In addition, the functions of the setting unit 556, such as determining the orientation of the camera and setting the top and bottom of the image, may be performed by another component, such as the CPU 344. Certain functions and components of the camera 110, such as the input buffer 538, frame buffers 536, or image processing and compression, are not discussed with respect to the method 600. However, in a preferred embodiment, these functions are performed in conjunction with the method 600. Consequently, the method 600 is independent of the hardware used. Finally, the method 600 may be used to define, for example, only the top or the bottom of a particular image rather than both the top and the bottom of the image.

FIGS. 7A and 7B are diagrams depicting the hardware components of the camera's 110 and 110' user interface 408. FIG. 7A is back view of the camera 110 showing the LCD screen 402, a four-way navigation control button 409, an overlay button 412, a menu button 414, and a set of programmable soft keys 416. FIG. 7B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The user interface 408 can include several different operating modes for supporting various camera functions. In play mode, the camera 100 displays an image. In review mode, the camera 100 supports the actions of reviewing camera contents, editing and sorting images, and printing and transferring images. In menu mode, the camera 100 allows the user to manipulate camera settings and to edit and organize captured images. In capture mode, the camera 100 supports the actions of preparing to capture an image, and capturing an image through the use of either the LCD screen 402 or the status LCD 406.

The user switches between the play, review, menu, and capture modes, using the mode dial 420. Orientation unit 560 of FIG. 3 can be used for both play mode and capture mode. When the camera is placed into a particular mode, that mode's default screen appears in the LCD screen 402 in which a set of mode-specific items, such as images, icons, and text, are displayed.

Figure 8A:
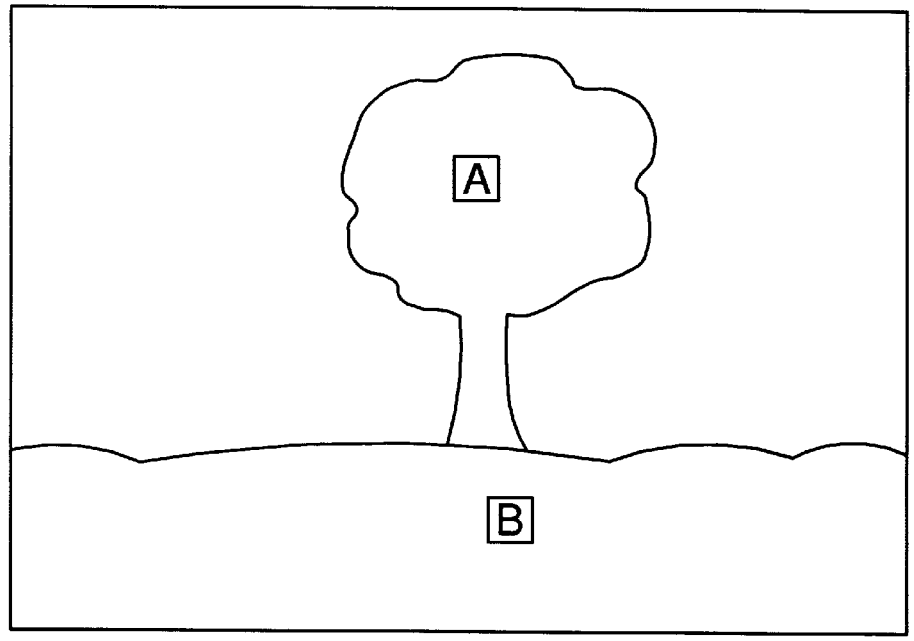
FIGS. 8a and 8b illustrate landscape and portrait images.
Figure 8B:
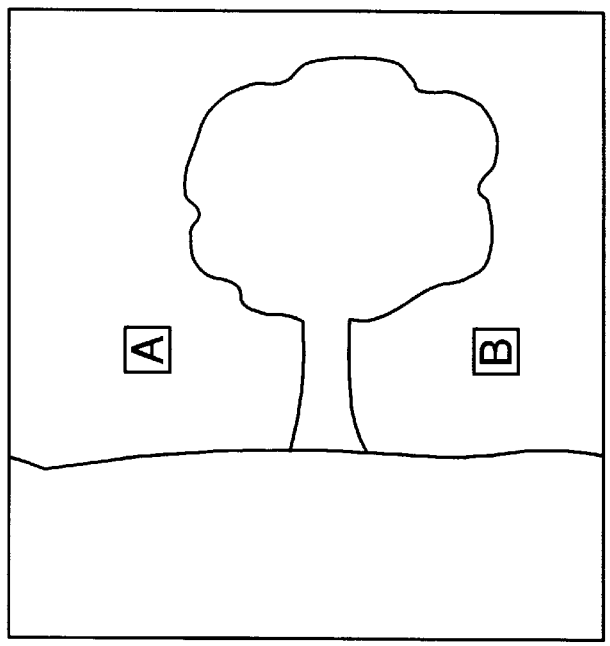

FIGS. 8a–8b show landscape and portrait images. FIG. 8a shows a landscape image while FIG. 8b shows a portrait image. Points a and b show a top center point and a bottom center point of a display on the digital camera.

Figure 9:
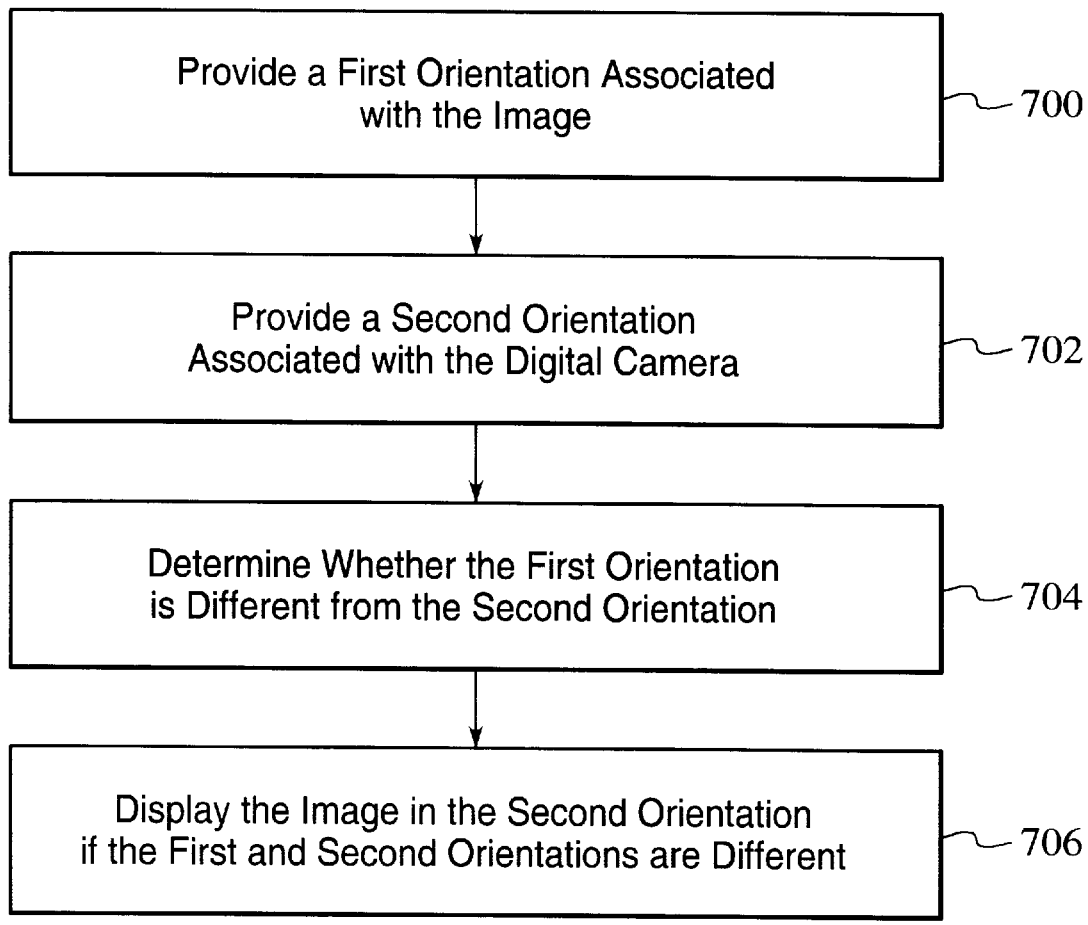
FIG. 9 is a flow diagram of a method according to the present invention of viewing an image in a digital camera.

FIG. 9 is a flow diagram of a method according to the present invention for automatically rotating a graphical user interface for managing portrait and landscape captures. A first orientation associated with the image is provided via step 700. The first orientation is preferably either landscape or portrait. A second orientation associated with the digital camera is provided via step 702. The second orientation is preferably either an orientation where a horizontal axis of the digital camera is substantially parallel to the surface of the earth, or the horizontal axes of the digital camera is substantially perpendicular to the surface of the earth. An example of one orientation associated when the camera is held by the user in a manner in which a landscape image would be recorded. Another example of an orientation of the digital camera would be if a portrait image would be recorded.

Figure 10A:
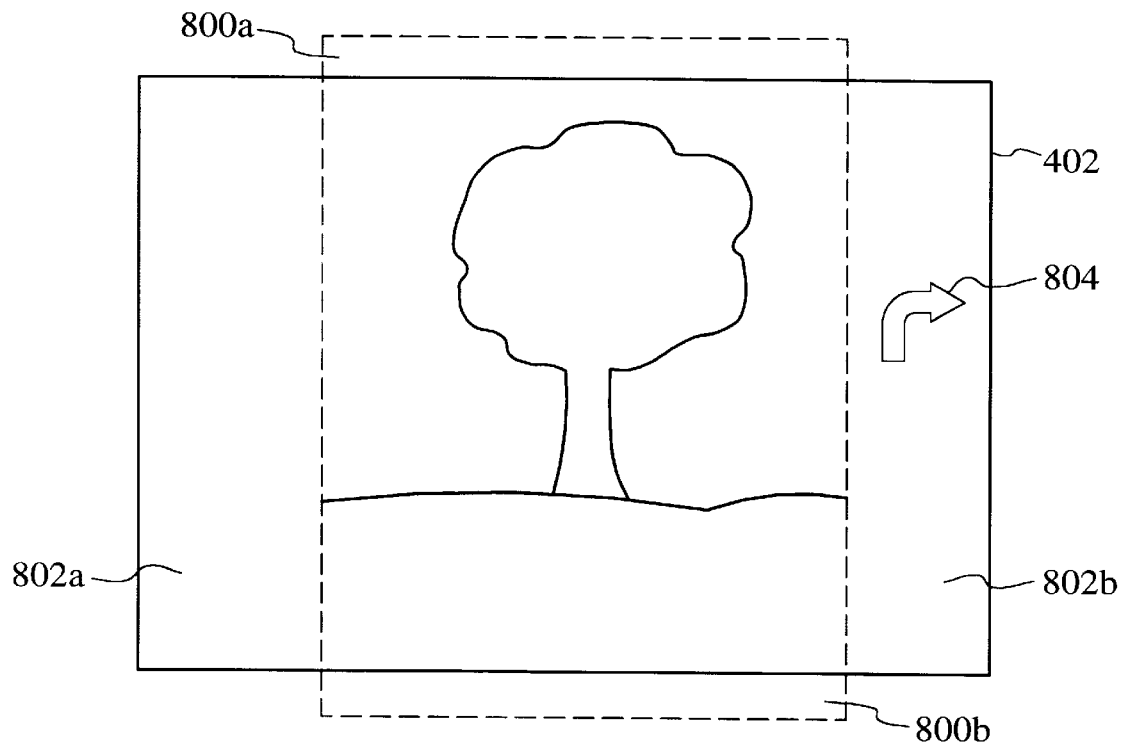
FIGS. 10a and 10b are illustrations of the automatic rotation of a portrait capture to a landscape oriented camera.
Figure 10B:
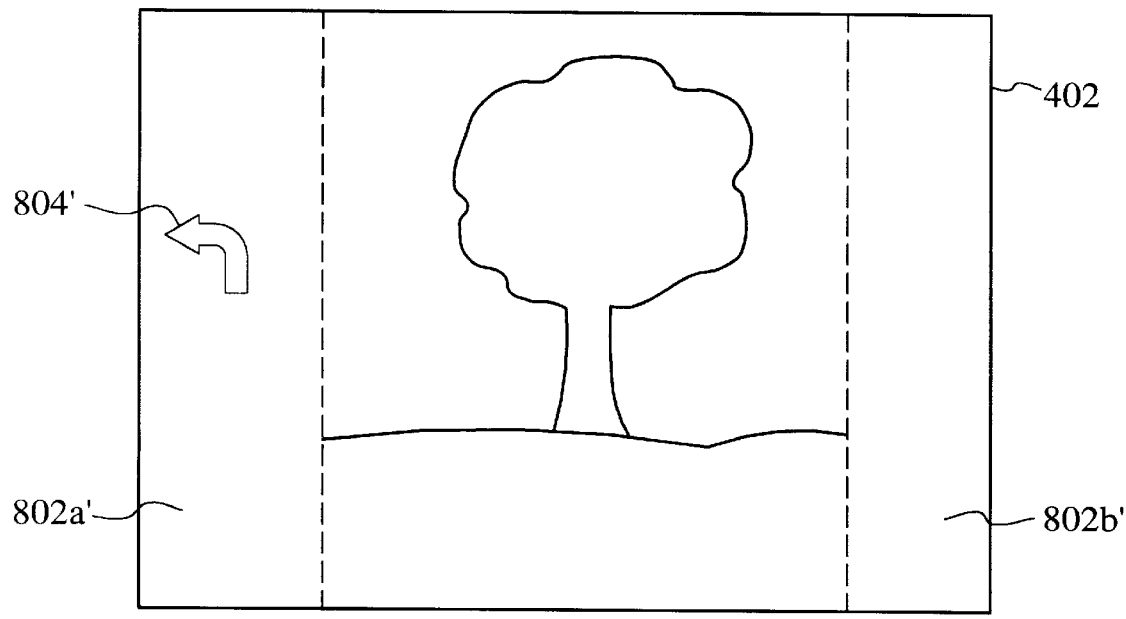

It is then determined whether the first orientation is different from the second orientation via step 704. The image is then displayed in the second orientation if the first and second orientation are found to be different via step 706. FIGS. 10a and 10b illustrate the rotation of a portrait image onto a landscape orientation. Portions 800a and 800b of the image can be cropped in order to fit the portrait image onto a landscape oriented display 402 of a digital camera. The remaining space on the display 402 can be covered with borders 802a and 802b. The borders 802a–802b can be either blank, colored, or include designs or icons for conveying information to the user. For example, an icon 804 can be used to indicate to the user that the digital camera can be rotated to view the image in its original portrait form.

FIG. 10b shows another method for rotating a portrait image onto a landscape oriented display 402. The portrait image can be reduced in size to display the entire image on the display 402. In this instance, no portion of the image would be cut for display. Again, borders 802a' and 802b' can be displayed along with the image.

Figure 11:
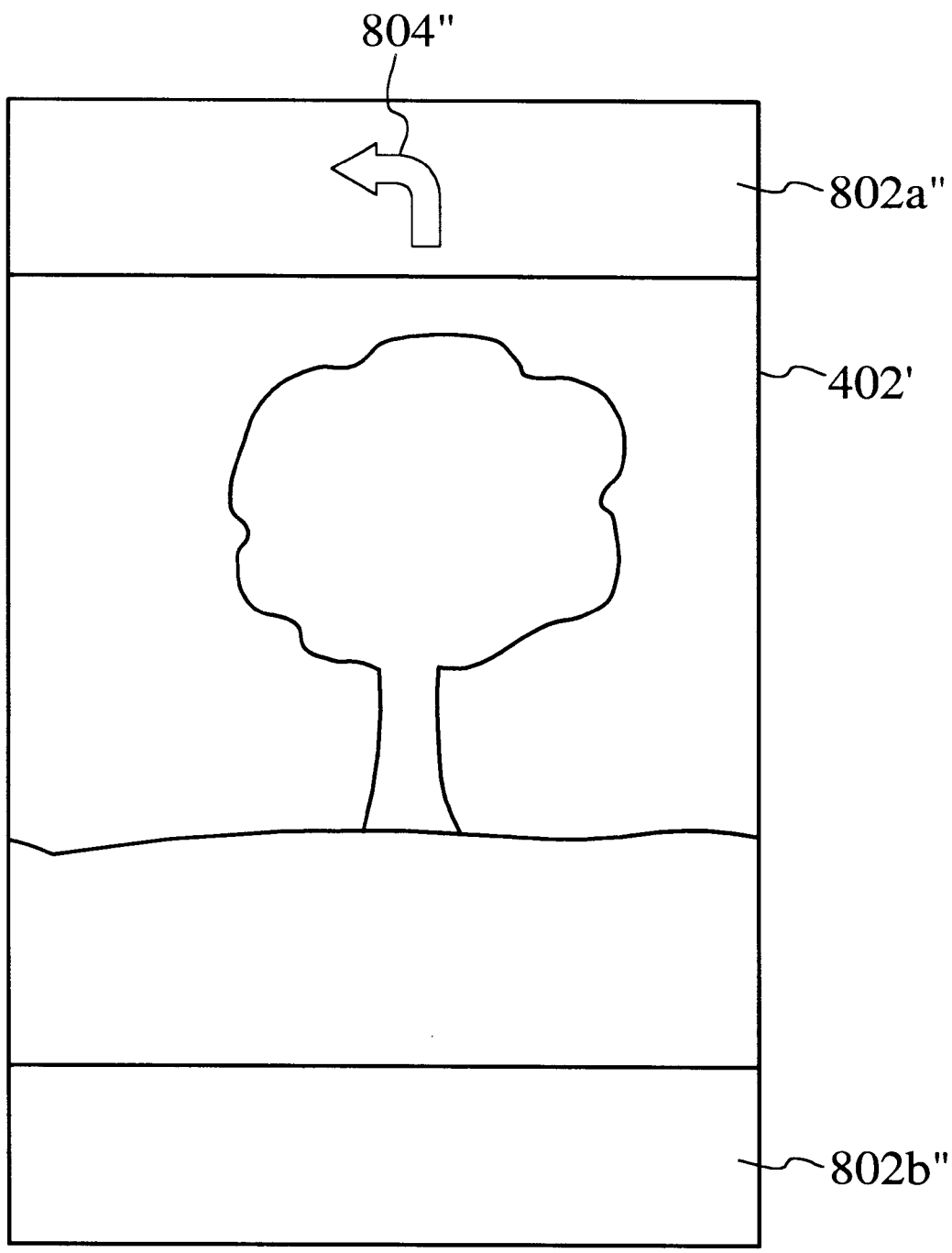
FIG. 11 illustrates an example of an automatic rotation of a landscape capture shown in a portrait oriented camera.

FIG. 11 shows an example of a landscape image being displayed on a portrait oriented display 402'. The landscape image can also have portions of the image cut to fit onto the portrait oriented display 402'. Alternatively, the landscape image may be reduced in size, as shown, to fit onto a portrait oriented display 402'. Borders 802a" and 802b" can be placed above and below the image. Additionally, icons, such as the arrow 804", can be used to convey information for the user.

Text and graphics may also be rotated as well as the image. Accordingly, a user should be able to view the image as well as text and graphics in the same orientation as the camera.

Figure 12:
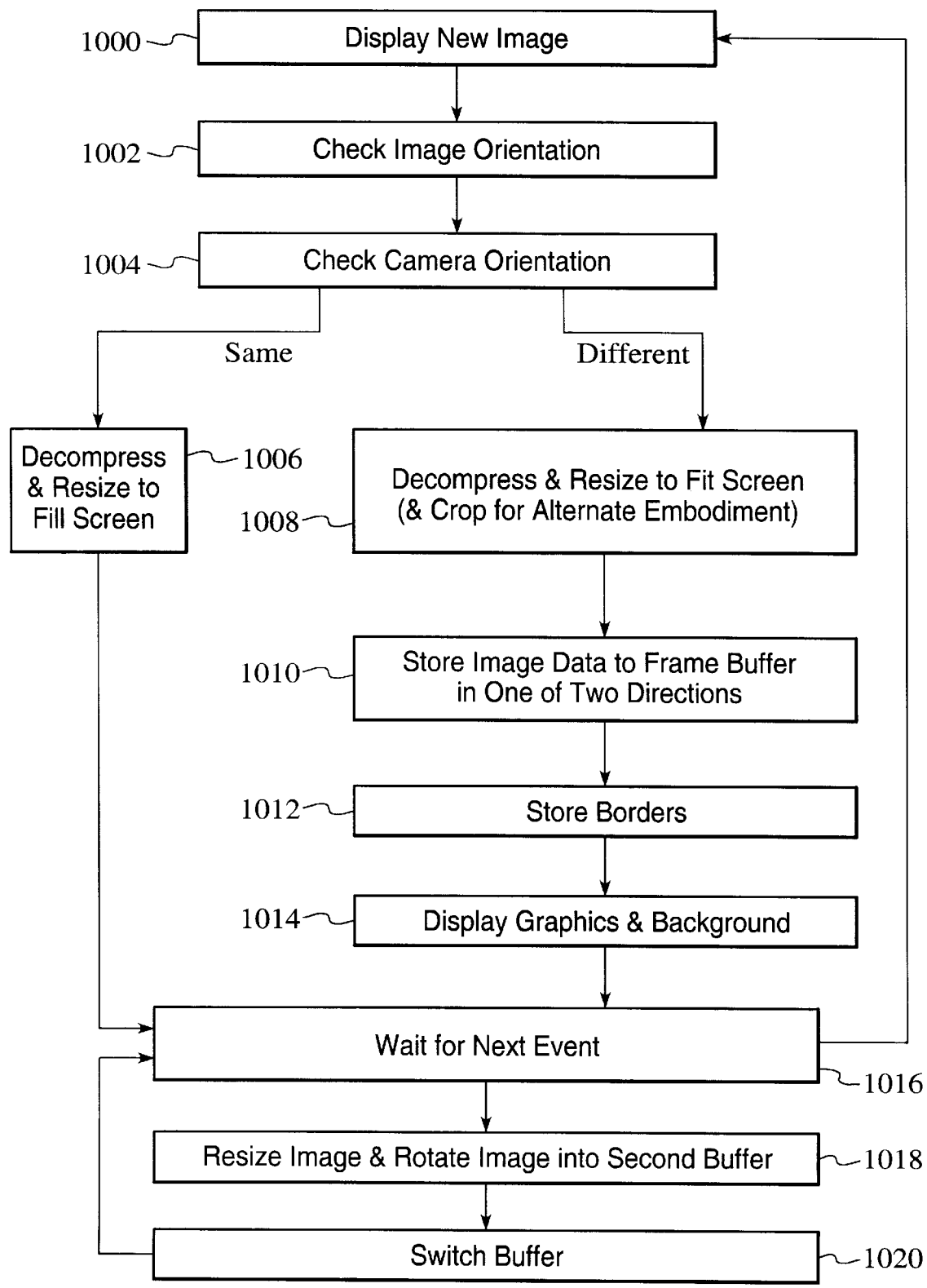
FIG. 12 is another flow diagram of the method according to the present invention.

FIG. 12 is a flow diagram of a method of viewing an image in an image capture unit according to the present invention. A new image is displayed via step 1000. An image orientation is determined via step 1002, and a camera orientation is also determined via step 1004. Alternative to first displaying an image via step 1000, the method according to the present invention can begin with the image orientation being determined via step 1002.

If the image orientation and the camera orientation are the same, then the image is decompressed and resized to fill the display via step 1006. If, however, the image orientation is different from the camera orientation, then the image is decompressed and resized to fit the display via step 1008. Alternatively, the image can be cropped, rather than resized, in order to fit the display.

The image data is then stored in the frame buffer 536 of FIG. 4A in one of two directions via step 1010. Determining which of the two directions depends upon how the image is to be rotated. For instance, if the image is to be resized from a portrait image to a landscape oriented display, then the image would need to be rotated as the image is being stored in the buffer. Likewise, a landscape portrait would also need to be rotated if it is being displayed on a portrait oriented display. Filling a buffer in a manner which rotates one orientation to another is well known in the art.

The borders can also be stored via step 1012. Graphics and background can also be displayed via step 1014. The graphics can include various icons, and/or directional arrows. While the digital camera system is waiting for the next event via step 1016, the image can be resized and rotated into a second frame buffer as shown in FIG. 4B, via step 1018. The two buffers can then be switched via step 1020.

What is meant by the frame buffers being switched is that the functions of the frame buffers are switched. For instance, while data is being transmitted to frame buffer A, previously processed data is output to the LCD screen for display. When the two buffers are switched, then image data is transmitted to frame buffer B while the previously processed data now located in frame buffer A is output to the LCD screen for display.

Figure 13:
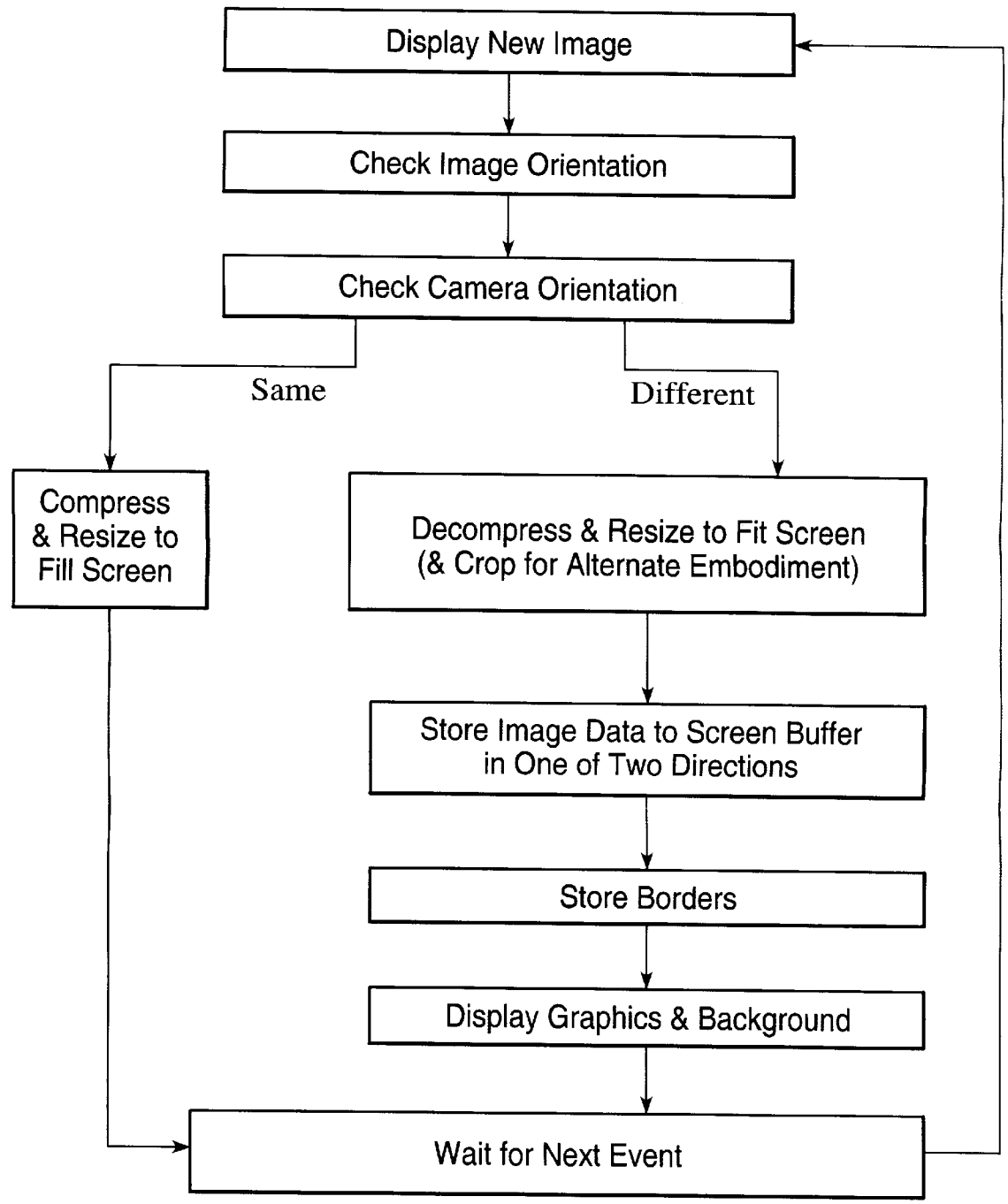
FIG. 13 is a flow diagram of an alternative method according to the present invention.

FIG. 13 is a flow diagram of another method according to the present invention. The method of FIG. 13 includes all of the steps shown in FIG. 12 except for those involving a second buffer via steps 1018 and 1020. The method of FIG. 12 is the preferred method since it requires less coding. However, the method of FIG. 13 can be executed with a single buffer.

The new image can be refreshed, or presented, in increments while in view of the user. Alternatively, the image and background can be fully prepared in the buffer prior to presentation on the display, and displayed as a complete image to the user.

Although the present invention has been described in accordance with the embodiments shown, one of ordinary skill in the art will readily recognize that there could be variations to the embodiments and those variations would be within the spirit and scope of the present invention. For example, the integrated user interface also applies to cameras having only two modes, but that have multiple navigation screens within the "play mode" Accordingly, many modifications may be made by one of ordinary skill in the art without departing from the spirit and scope of the appended claims.

What is claimed is:

1. A method for viewing an image in an image capture unit including an integrated display, the method comprising the steps of:

determining a first orientation associated with the image at capturing of the image, the image being a captured image;

storing the image, including storing the information relating to the first orientation associated with the image;

determining a second orientation associated with the image capture unit at a display time corresponding to displaying the image after the image is captured, the second orientation capable of being different from the first orientation;

determining whether the first orientation is different from the second orientation;

displaying the image in the second orientation on the integrated display of the image capture unit; and if the image capture unit is rotated to a third orientation during display of the image, the method further includes, determining the third orientation of the image capture unit, determining whether the third orientation is different from the second orientation, the first orientation, or both, and rotating the image to be displayed in the third orientation if the third orientation is different from the second orientation.

2. The method of claim 1, wherein the image is rotated to the second orientation when the first orientation is different from the second orientation.

3. The method of claim 1, wherein the first orientation is a landscape orientation.

4. The method of claim 1, wherein the first orientation is a portrait orientation.

5. The method of claim 1, wherein the second orientation is an orientation in which a horizontal axis of the image capture unit is substantially parallel to a surface of the earth.

6. The method of claim 1, wherein the second orientation is an orientation in which a horizontal axis of the image capture unit is substantially perpendicular to a surface of the earth.

7. The method of claim 1, wherein the image is resized to fit the display.

8. The method of claim 1, wherein the image is cropped to fit the display.

9. The method of claim 1, wherein data related to the image is stored in a buffer in a manner which allows the image to be displayed in the second orientation.

10. The method of claim 1, wherein borders are displayed between an edge of the image and an edge of the display.

11. The method of claim 1, wherein at least one graphic is displayed on the display.

12. The method of claim 1, wherein at least one icon is displayed on the display.

13. The method of claim 1, wherein at least one directional icon is displayed on the display.

14. The method of claim 1, wherein data associated with the image is stored in a first buffer.

15. The method of claim 14, wherein data associated with the image is also stored in a second buffer.

16. The method of claim 1, further comprising a step of displaying text in the second orientation.

17. The method of claim 1, further comprising a step of displaying a graphic in the second orientation.

18. A system for viewing images in an image capture unit comprising:

an image associated with a first orientation determined at capturing of the image, the image being a captured image;

means for storing the image, including storing information relating to the first orientation associated with the image;

a second orientation associated with the image capture unit determined at a display time corresponding to displaying the image after the image is captured, the second orientation capable of being different from the first orientation, wherein it is determined whether the first orientation is different from the second orientation;

a display, in the image capture unit, to display the image in the second orientation;

wherein the image is rotated from the first orientation to the second orientation when the first orientation is different from the second orientation for viewing on the display of the image capture unit; and if the image capture unit is rotated to a third orientation during display of the image, the system further includes, means for determining the third orientation of the image capture unit, means for determining whether the third orientation is different from the second orientation, the first orientation, or both, and means for rotating the image to be displayed in the third orientation if the third orientation is different from the second orientation.

19. The system of claim 18, wherein the first orientation is a landscape orientation.

20. The system of claim 18, wherein the first orientation is a portrait orientation.

21. The system of claim 18, wherein the second orientation is an orientation in which a horizontal axis of the image capture unit is substantially parallel to a surface of the earth.

22. The system of claim 18, wherein the second orientation is an orientation in which a horizontal axis of the image capture unit is substantially perpendicular to a surface of the earth.

23. The system of claim 18, further comprising an image orientation sensor for determining the second orientation associated with the image capture unit and the first orientation of the image.

24. The system of claim 18, further comprising a buffer to store data associated with the image.

25. The system of claim 22, further comprising a buffer to store data associated with the image.

26. The system of claim 18, wherein the image is resized to fit the display.

27. The system of claim 18, wherein the image is cropped to fit the display.

28. The system of claim 18, wherein data related to the image is stored in a buffer in a manner which allows the image to be displayed in the second orientation.

29. The system of claim 18, wherein borders are displayed between an edge of the image and an edge of the display.

30. The system of claim 16, wherein at least one graphic is displayed on the display.

31. The system of claim 18, wherein at least one icon is displayed on the display.

32. The system of claim 18, wherein at least one direction icon is displayed on the display.

33. A digital camera capable of displaying an image having a first orientation, the digital camera comprising:

means for capturing the image, the image having the first orientation at capturing of the image, the image being a captured image;

means for storing the image in a compressed format image and storing the first orientation;

means for determining a second orientation associated with the digital camera at a display time corresponding to displaying the image after the image is captured, the second orientation capable of being different from the first orientation;

means coupled with the determining means for comparing the first orientation and the second orientation;

means coupled with the determining means for rotating the image from the first orientation to the second orientation if the first orientation is different from the second orientation;

an integrated display coupled with the rotating means for displaying the image in the second orientation; and if the digital camera is rotated to a third orientation during display of the image, the digital camera further includes, the second orientation determining means determines the third orientation of the digital camera;

the comparing means determines whether the third orientation is different from the second orientation, the first orientation, or both, and the rotating means rotates the image to be displayed in the third orientation if the third orientation is different from the second orientation.

34. The digital camera of claim 33 further comprising:

means coupled with the comparing means and the rotating means for decompressing the image.

35. The method of claim 1 wherein the step of displaying the image includes the steps of:

retrieving the image that was previously stored;

decompressing the image if the image was compressed during the storing step; and displaying the image in the second orientation currently associated with the camera on the display of the image capture unit.

36. The system of claim 18 wherein the image is a previously stored image that is retrieved, decompressed the image if the image was compressed during the storing step and displayed in the second orientation currently associated with the camera on the display of the image capture unit.

37. The digital camera of claim 33 wherein the image is a previously stored image that is retrieved, decompressed the image if the image was compressed during storage and displayed in the second orientation currently associated with the camera on the integrated display of the digital camera.

38. The method of claim 1 wherein the first orientation of the image and the second orientation of the image capture unit are determined using at least one orientation sensor.

39. The digital camera of claim 33 wherein the second orientation determining means further include at least one orientation sensor for determining the orientation of the image capture unit.

40. A method for viewing an image in an image capture unit including an integrated display, the method comprising the steps of:

determining a first orientation associated with the image at capturing of the image, the image being a captured image;

storing the image, including storing the information relating to the first orientation associated with the image;

determining a second orientation associated with the image capture unit at a display time corresponding to displaying the image after the image is captured, the second orientation capable of being different from the first orientation;

determining whether the first orientation is different from the second orientation; and displaying the image in the second orientation on the integrated display of the image capture unit, wherein the first orientation of the image is capable of being a landscape orientation or a portrait orientation, wherein the second orientation of the image capture unit is capable of being the landscape orientation or the portrait orientation, and wherein the displaying step includes the steps of:

rotating the image to be in the landscape orientation if the second orientation is the landscape orientation and the first orientation is the portrait orientation, rotating the image to be in the portrait orientation if the second orientation is the portrait orientation and the first orientation is the landscape orientation, displaying the image in the landscape orientation if the first orientation and the second orientation are each the landscape orientation, and displaying the image in the portrait orientation if the first orientation and the second orientation are each the portrait orientation.

41. A system for viewing images in an image capture unit comprising:
   an image associated with a first orientation determined at capturing of the image, the image being a captured image;
   means for storing the image, including storing information relating to the first orientation associated with the image;
   a second orientation associated with the image capture unit determined at a display time corresponding to displaying the image after the image is captured, the second orientation capable of being different from the first orientation, wherein it is determined whether the first orientation is different from the second orientation; and
   a display, in the image capture unit, to display the image in the second orientation;
   wherein the image is rotated from the first orientation to the second orientation when the first orientation is different from the second orientation for viewing on the display of the image capture unit, wherein the first orientation of the image is capable of being a landscape orientation or a portrait orientation, wherein the second orientation of the image capture unit is capable of being the landscape orientation or the portrait orientation, and wherein
   the image is rotated to be in the landscape orientation if the second orientation is the landscape orientation and the first orientation is the portrait orientation,
   the image is rotated to be in the portrait orientation if the second orientation is the portrait orientation and the first orientation is the landscape orientation,
   the image is displayed in the landscape orientation if the first orientation and the second orientation are each the landscape orientation, and
   the image is displayed in the portrait orientation if the first orientation and the second orientation are each the portrait orientation.

42. A digital camera capable of displaying an image having a first orientation, the digital camera comprising:
   means for capturing the image, the image having the first orientation at capturing of the image, the image being a captured image;
   means for storing the image in a compressed format image and storing the first orientation;
   means for determining a second orientation associated with the digital camera at a display time corresponding to displaying the image after the image is captured, the second orientation capable of being different from the first orientation;
   means coupled with the determining means for comparing the first orientation and the second orientation;
   means coupled with the determining means for rotating the image from the first orientation to the second orientation if the first orientation is different from the second orientation; and
   an integrated display coupled with the rotating means for displaying the image in the second orientation, wherein the first orientation of the image is capable of being a landscape orientation or a portrait orientation, wherein the second orientation of the image capture unit is capable of being the landscape orientation or the portrait orientation, and wherein the rotating means further rotates the image to be in the landscape orientation if the second orientation is the landscape orientation and the first orientation is the portrait orientation, rotate the image to be in the portrait orientation if the second orientation is the portrait orientation and the first orientation is the landscape orientation, display the image in the landscape orientation if the first orientation and the second orientation are each the landscape orientation, and display the image in the portrait orientation if the first orientation and the second orientation are each the portrait orientation.

* * * * *

Disclaimer

6,262,769 B1 — Eric C. Anderson, San Jose; George W. Dalke, Palo Alto, both of CA (US). METHOD AND SYSTEM FOR AUTO ROTATING A GRAPHICAL USER INTERFACE FOR MANAGING PORTRAIT AND LANDSCAPE IMAGES IN AN IMAGE CAPTURE UNIT. Patent dated Jul. 17, 2001. Disclaimer filed Nov. 04, 2010 by the Assignee, FlashPoint Technology, Inc.

Hereby disclaims claims 40 and 41 of said patent.

(*Official Gazette* December 28, 2010)

UNITED STATES PATENT AND TRADEMARK OFFICE
CERTIFICATE OF CORRECTION

| | | |
|---|---|---|
| PATENT NO. | : 6,262,769 B1 | Page 1 of 1 |
| APPLICATION NO. | : 08/903898 | |
| DATED | : July 17, 2001 | |
| INVENTOR(S) | : Anderson et al. | |

It is certified that error appears in the above-identified patent and that said Letters Patent is hereby corrected as shown below:

In column 11, at line 36, please change "30. The system of claim 16" to --The system of claim 18--.

Signed and Sealed this

Fifteenth Day of March, 2011

David J. Kappos
*Director of the United States Patent and Trademark Office*

INTER PARTES REEXAMINATION CERTIFICATE (1148th)
United States Patent
Anderson et al.

(10) Number: US 6,262,769 C1
(45) Certificate Issued: Jul. 24, 2015

(54) METHOD AND SYSTEM FOR AUTO ROTATING A GRAPHICAL USER INTERFACE FOR MANAGING PORTRAIT AND LANDSCAPE IMAGES IN AN IMAGE CAPTURE UNIT

(75) Inventors: Eric C. Anderson, San Jose, CA (US); George W. Dalke, Palo Alto, CA (US)

(73) Assignee: FLASHPOINT TECHNOLOGY, INC., San Jose, CA (US)

Reexamination Request:
No. 95/001,433, Aug. 30, 2010

Reexamination Certificate for:
Patent No.: 6,262,769
Issued: Jul. 17, 2001
Appl. No.: 08/903,898
Filed: Jul. 31, 1997

Disclaimer of Claims 40 and 41
Filed: Dec. 28, 2010 (OG notice 1361 OG 240).

Certificate of Correction issued Mar. 15, 2011

(51) Int. Cl.
*H04N 5/222* (2006.01)
*H04N 9/31* (2006.01)
(52) U.S. Cl.
CPC .................................. *H04N 9/3176* (2013.01)

(58) Field of Classification Search
CPC ............. H04N 5/23293; H04N 1/2112; G08B 13/19626
USPC ............... 348/333.01, 231.1–231.9, 321, 333, 348/334, 362, 369, 374; 396/50, 311
See application file for complete search history.

(56) References Cited

To view the complete listing of prior art documents cited during the proceeding for Reexamination Control Number 95/001,433, please refer to the USPTO's public Patent Application Information Retrieval (PAIR) system under the Display References tab.

*Primary Examiner* — Henry N Tran

(57) ABSTRACT

The present invention provides a method and apparatus for automatically rotating a graphical user interface for managing portrait and landscape captures in an image capture unit. A method and apparatus for viewing an image in an image capture unit including a display comprises the steps of providing a first orientation associated with the image and providing a second orientation associated with the image capture unit. It is then determined whether the first orientation is different from the second orientation, and the image is displayed in the second orientation if the first and second orientations are different from each other.

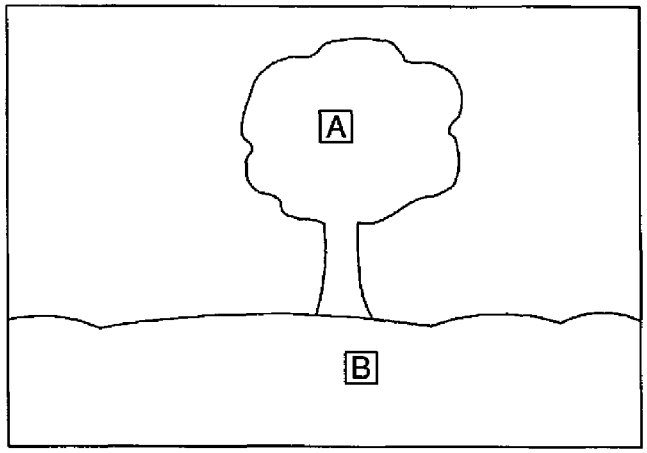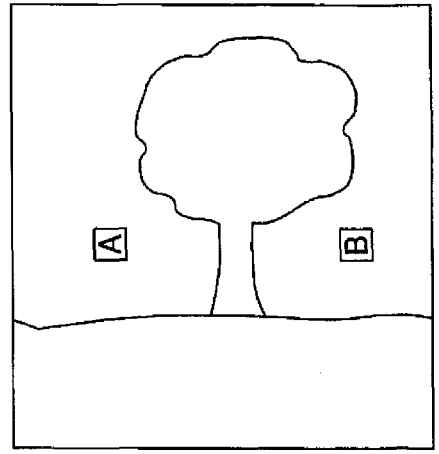

US 6,262,769 C1

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-39 and 42 is confirmed.

Claims 40 and 41 were previously disclaimed.

New claims 43-91 are added and determined to be patentable.

Claims 40 and 41 were not reexamined.

43. *The method of claim 1 wherein prior to displaying the image in the second orientation, the image is rotated from the first orientation to the second orientation when the first orientation is different from the second orientation.*

44. *The method of claim 43 wherein the first orientation is determined by at least one orientation sensor as the image is captured and the second orientation is determined by the at least one orientation sensor as the image is to be displayed in the second orientation.*

45. *The method of claim 1 wherein the first orientation is one of a portrait orientation and a landscape orientation and the second orientation is another of the portrait orientation and the landscape orientation.*

46. *The method of claim 45 further comprising displaying on the integrated display a graphical user interface in the first orientation when the image is captured in the first orientation and displaying the graphical user interface in the second orientation when the image is displayed in the second orientation.*

47. *The method of claim 45 further comprising displaying on the integrated display a graphical user interface in the second orientation along with the image when the image is displayed in the second orientation and rotating the graphical user interface from the second orientation to the third orientation in response to the image capture unit being rotated from the second orientation to the third orientation.*

48. *The method of claim 47 wherein the image is rotated along with the graphical user interface from the second orientation to the third orientation in response to the image capture unit being rotated from the second orientation to the third orientation.*

49. *The method of claim 45 further comprising displaying on the integrated display a graphical user interface in the first orientation when the image is captured in the first orientation and rotating the graphical user interface from the first orientation to the second orientation in response to the image capture unit being rotated from the first orientation to the second orientation.*

50. *The method of claim 49 wherein the graphical user interface relates to a capture mode when the image is captured and relates to a play mode when the image is displayed.*

51. *The method of claim 50 wherein the image is displayed in the second orientation as the graphical user interface is displayed in the second orientation.*

52. *The method of claim 45 further comprising displaying on the integrated display, along with the image, a graphical user interface wherein as the image capture unit is rotated, the image and the graphical user interface are rotated to the same orientation as the image capture unit.*

53. *The method of claim 52 wherein the graphical user interface comprises at least one of a graphic and an icon to convey information to a user.*

54. *The method of claim 45 wherein the first orientation is determined by at least one orientation sensor as the image is captured and the second orientation is determined by the at least one orientation sensor as the image is to be displayed in the second orientation.*

55. *The method of claim 45 further comprising displaying on the integrated display, along with the image, at least one of a graphic, an icon, or text wherein as the image capture unit is rotated, the image and the at least one of the graphic, the icon, or the text are rotated to the same orientation as the image capture unit.*

56. *The method of claim 45 wherein the image is displayed at a first size in the second orientation and resized to a second size for display in the third orientation.*

57. *The method of claim 45 wherein the image is displayed uncropped in the second orientation and cropped for display in the third orientation.*

58. *The method of claim 45 wherein after the image is displayed in the second orientation and the image capture unit is rotated to the third orientation, the image is rotated to the third orientation in a buffer prior to being displayed as a complete image in the third orientation.*

59. *The method of claim 45 wherein after the image is displayed in the second orientation and the image capture unit is rotated to the third orientation, the image is displayed in increments as the image is rotated and displayed in the third orientation.*

60. *The method of claim 45 further comprising providing a background and displaying the background with the image in at least one of the second orientation and the third orientation.*

61. *The system of claim 18 wherein the first orientation is one of a portrait orientation and a landscape orientation and the second orientation is another of the portrait orientation and the landscape orientation.*

62. *The system of claim 61 wherein a graphical user interface is displayed on the display in the first orientation when the image is captured in the first orientation and displayed in the second orientation when the image is displayed in the second orientation.*

63. *The system of claim 61 wherein a graphical user interface is displayed on the display in the second orientation along with the image when the image is displayed in the second orientation and rotated from the second orientation to the third orientation in response to the image capture unit being rotated from the second orientation to the third orientation.*

64. *The system of claim 63 wherein the image is rotated along with the graphical user interface from the second orientation to the third orientation in response to the image capture unit being rotated from the second orientation to the third orientation.*

65. *The system of claim 61 wherein a graphical user interface is displayed on the display in the first orientation when the image is captured in the first orientation and rotated from the first orientation to the second orientation in response to the image capture unit being rotated from the first orientation to the second orientation.*

66. *The system of claim 65 wherein the user interface graphical user interface relates to a capture mode when the image is captured and relates to a play mode when the image is displayed.*

67. The system of claim 66 wherein the image is displayed in the second orientation as the graphical user interface is displayed in the second orientation.

68. The system of claim 61 wherein a graphical user interface is displayed on the display and as the image capture unit is rotated, the image and the graphical user interface are rotated to the same orientation as the image capture unit.

69. The system of claim 68 wherein the graphical user interface comprises at least one of a graphic and an icon to convey information to a user.

70. The system of claim 61 wherein at least one of a graphic, an icon, or text displayed on the display along with the image and as the image capture unit is rotated, the image and the at least one of the graphic, the icon, or the text are rotated to the same orientation as the image capture unit.

71. The system of claim 61 wherein the image is displayed at a first size in the second orientation and resized to a second size for display in the third orientation.

72. The system of claim 61 wherein the image is displayed uncropped in the second orientation and cropped for display in the third orientation.

73. The system of claim 61 wherein after the image is displayed in the second orientation and the image capture unit is rotated to the third orientation, the image is rotated to the third orientation in a buffer prior to being displayed as a complete image in the third orientation.

74. The system of claim 61 wherein after the image is displayed in the second orientation and the image capture unit is rotated to the third orientation, the image is displayed in increments as the image is rotated and displayed in the third orientation.

75. The system of claim 61 wherein a background is displayed with the image in at least one of the second orientation and the third orientation.

76. The digital camera of claim 33 wherein the first orientation is one of a portrait orientation and a landscape orientation and the second orientation is another of the portrait orientation and the landscape orientation.

77. The digital camera of claim 76 wherein a graphical user interface is displayed on the integrated display in the first orientation when the image is captured in the first orientation and displayed in the second orientation when the image is displayed the second orientation.

78. The digital camera of claim 76 wherein a graphical user interface is displayed on the integrated display in the second orientation along with the image when the image is displayed in the second orientation and rotated from the second orientation to the third orientation in response to the digital camera being rotated from the second orientation to the third orientation.

79. The digital camera of claim 78 wherein the image is rotated along with the graphical user interface from the second orientation to the third orientation in response to the digital camera being rotated from the second orientation to the third orientation.

80. The digital camera of claim 76 wherein a graphical user interface is displayed on the integrated display in the first orientation when the image is captured in the first orientation and rotated from the first orientation to the second orientation in response to the digital camera being rotated from the first orientation to the second orientation.

81. The digital camera of claim 80 wherein the graphical user interface relates to a capture mode when the image is captured and relates to a play mode when the image is displayed.

82. The digital camera of claim 81 wherein the image is displayed in the second orientation as the graphical user interface is displayed in the second orientation.

83. The digital camera of claim 76 wherein a graphical user interface is displayed on the integrated display and as the image capture unit is rotated, the image and the graphical user interface are rotated to the same orientation as the digital camera.

84. The digital camera of claim 83 wherein the graphical user interface comprises at least one of a graphic and an icon to convey information to a user.

85. The digital camera of claim 76 wherein at least one of a graphic, an icon, or text displayed on the integrated display along with the image and as the digital camera is rotated, the image and the at least one of the graphic, the icon, or the text are rotated to the same orientation as the digital camera.

86. The digital camera of claim 76 wherein the image is displayed at a first size in the second orientation and resized to a second size for display in the third orientation.

87. The digital camera of claim 76 wherein the image is displayed uncropped in the second orientation and cropped for display in the third orientation.

88. The digital camera of claim 76 wherein after the image is displayed in the second orientation and the digital camera is rotated to the third orientation, the image is rotated to the third orientation in a buffer prior to being displayed as a complete image in the third orientation.

89. The digital camera of claim 76 wherein after the image is displayed in the second orientation and the image capture unit is rotated to the third orientation, the image is displayed in increments as the image is rotated and displayed in the third orientation.

90. The digital camera of claim 76 wherein a background is displayed with the image in at least one of the second orientation and the third orientation.

91. A method for viewing an image in an image capture unit including an integrated display, the method comprising the steps of:

determining a first orientation associated with the image at capturing of the image, the image being a captured image when the image capture unit is in the first orientation;

displaying a graphical user interface in the first orientation when the image capture unit is in the first orientation;

storing the image, including storing information relating to the first orientation associated with the image;

determining a second orientation associated with the image capture unit at a display time corresponding to displaying the image after the image is captured, the second orientation being different from the first orientation;

determining whether the first orientation is different from the second orientation;

displaying the image and the graphical user interface in the second orientation on the integrated display of the image capture unit when the image capture unit is in the second orientation; and when the image capture unit is rotated to a third orientation during display of the image, the method further includes,
determining the third orientation of the image capture unit,
determining whether the third orientation is different from the second orientation, and
rotating the image to be displayed and the graphical user interface to the third orientation if the third orientation is different from the second orientation,

*wherein the first orientation is one of a portrait orientation and a landscape orientation and the second orientation is another of the portrait orientation and the landscape orientation.*

\* \* \* \* \*